United States Patent [19]
Lutz et al.

[11] Patent Number: 4,816,497
[45] Date of Patent: Mar. 28, 1989

[54] INFUSIBLE PRECERAMIC SILAZANE POLYMERS VIA ULTRAVIOLET IRRADIATION

[75] Inventors: Michael A. Lutz, Midland, Mich.; Ronald S. Reaoch, Elizabethtown, Ky.; Philip E. Reedy, Jr., Davis, Calif.

[73] Assignee: The Dow Corning Corporation, Midland, Mich.

[21] Appl. No.: 905,020

[22] Filed: Sep. 8, 1986

[51] Int. Cl.$^4$ .......................... B32B 22/16; C08J 3/28; B05D 3/06
[52] U.S. Cl. ........................................ 522/46; 522/42; 522/44; 428/364; 525/474; 525/477
[58] Field of Search ..................... 522/46, 44, 42, 146; 525/474, 477; 528/28, 32

[56] References Cited

U.S. PATENT DOCUMENTS 4,537,942  8/1985  Brown-Wensley ................... 528/12
4,611,035  9/1986  Brown-Wensley ................. 525/474
4,631,260  12/1986  Bartos ..................................... 501/87

Primary Examiner—Wilbert J. Briggs, Sr.
Assistant Examiner—David Buttner
Attorney, Agent, or Firm—Robert L. McKellar

[57] ABSTRACT

A method is disclosed for the preparation of ceramic materials or articles by the pyrolysis of mixtures of vinyl- or allyl-containing preceramic silazane polymers, mercapto compounds, and photoinitiators wherein the mixtures are rendered infusible prior to pyrolysis by ultraviolet (UV) irradiation. This method is especially suited for the preparation of ceramic fibers.

20 Claims, No Drawings

INFUSIBLE PRECERAMIC SILAZANE POLYMERS VIA ULTRAVIOLET IRRADIATION

STATEMENT OF GOVERNMENT RIGHTS

The United States Government has rights in this invention pursuant to Contract Number F33615-83-C-5006 awarded by the United States Air Force.

BACKGROUND OF INVENTION

This invention relates to the preparation of ceramic materials or articles by the pyrolysis of mixtures of vinyl- or allyl-containing preceramic silazane polymers, mercapto compounds, and photoinitiators wherein the mixtures are rendered infusible prior to pyrolysis by ultraviolet (UV) irradiation. This method is especially suited for the preparation of ceramic fibers.

Ceramic materials have been prepared by the pyrolysis of various preceramic polymers in the prior art. Gaul in U.S. Pat. No. 4,312,970 (issued Jan. 26, 1982) obtained ceramic materials by the pyrolysis of preceramic silazane polymers prepared by reacting organochlorosilanes and disilazanes. The preceramic silazane polymers were pyrolyzed in an inert atmosphere without any separate treatment to first render the preceramic silazane polymer infusible.

Gaul in U.S. Pat. 4,340,619 (issued July 20, 1982) obtained ceramic materials by the pyrolysis of preceramic silazane polymers prepared by reacting chlorine-containing disilanes and disilazanes. Fibers prepared from such preceramic silazane polymers were given a "mild heat treatment" in air before pyrolysis but there is no teaching that such a treatment rendered the fibers infusible.

Cannady in U.S. Pat. No. 4,540,803 (issued Sept. 10, 1985) obtained ceramic materials by the pyrolysis of preceramic silazane polymers prepared by reacting trichlorosilane and disilazane. The preceramic silazane polymers were not rendered infusible prior to pyrolysis to form ceramic materials.

Haluska in U.S. Pat. No. 4,546,163 (issued Oct. 8, 1985) prepared vinyl-containing polysilanes of the average formula

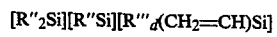

[R''$_2$Si][R''Si][R'''$_d$(CH$_2$=CH)Si]

where R'' was an alkyl radical containing 1 to 4 carbon atoms, R''' was an alkyl radical containing 1 to 4 carbon atoms, a vinyl radical or a phenyl radical, d was 1 or 2 and where the polysilane contained 0 to 60 mole percent [R''$_2$Si] units, 30 to 99.5 mole percent [R''Si] units, and 0.5 to 15 mole percent [R'''$_d$(CH$_2$=CH)Si] units. Shaped articles prepared from such polysilanes could be rendered infusible prior to pyrolysis by UV treatment. Neither mercapto compounds, photoinitiators, or preceramic silazane polymers were employed. Typical fibers required UV exposure times of 0.5 to 20 minutes at a dosage of about 100 mJ/cm$^2$.

West et al. in Polym. Prepr., 25, 4(1984) disclosed the preparation of polysilanes of general formula

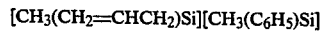

[CH$_3$(CH$_2$=CHCH$_2$)Si][CH$_3$(C$_6$H$_5$)Si]

by the sodium metal reduction of allylmethyldichlorosilane and methylphenyldichlorosilane. These allyl-containing polysilanes were rapidly gelled by irradiation with UV light. Neither mercapto compounds, photoinitiators, or preceramic silazane polymers were employed.

Bartos et al. in U.S. patent application Ser. No. 748,109, filed June 24, 1985, now abandoned, obtained infusible preceramic silazane polymers by treatment of the preceramic silazane polymer with steam or a steam and oxygen mixture.

Lipowitz, in a copending U.S. patent application entitled "Infusible Preceramic Polymers via Plasma Treatment", obtained infusible preceramic polymers by treatment of preceramic polymers with a plasma energy source. Both vinyl-containing and vinyl free preceramic polymers were rendered infusible by this technique.

What has been newly discovered is a method of rendering preceramic silazane polymers infusible prior to pyrolysis. This method represents a significant advance in the art of preparing ceramic materials or articles, especially in the art of preparing ceramic fibers.

THE INVENTION

This invention relates to a method of rendering a preceramic silazane polymer material infusible prior to pyrolysis, which method comprises treating the preceramic silazane polymer material with UV irradiation for a time sufficient to render the preceramic silazane polymer material infusible wherein the preceramic silazane polymer material contains (1) a vinyl- or allyl-containing preceramic silazane polymer with an average of at least 0.7 vinyl or allyl groups per molecule, (2) a mercapto compound with at least two SH groups per molecule, and (3) a photoinitiator.

This invention also relates to a preceramic silazane polymer composition comprising (1) a vinyl- or allyl-containing preceramic silazane polymer with an average of at least 0.7 vinyl or allyl groups per molecule, (2) a mercapto compound with at least two SH groups per molecule, and (3) a photoinitiator.

Treatment of the preceramic silazane polymer compositions of the present invention with UV irradiation will result in an infusible preceramic silazane polymer material suitable for pyrolysis to form a ceramic material. Preceramic silazane polymer compositions in the form of pellets, powders, flakes, foams, fibers, and the like are especially suitable for treatment with UV irradiation by the method of this invention. Preceramic silazane polymer compositions in the form of fibers are especially preferred in the practice of this invention.

The temperature of the treatment of the preceramic silazane polymer composition with UV irradiation must be sufficiently low so that the preceramic silazane polymer composition does not melt or fuse during the UV treatment step. Preferably the treatment temperature is between room temperature and the softening temperature of the preceramic silazane polymer. As one skilled in the art would realize, the softening temperature of individual preceramic silazane polymer compositions will depend in large part upon the reactants and reaction conditions employed to prepare the vinyl- or allyl-containing preceramic silazane polymer as well as the specific mercapto compound and photoinitiator employed. More preferably the temperature of the treatment by UV irradiation should be between room temperature and about 10° C. below the softening temperature of the preceramic silazane polymer composition.

The preceramic silazane polymer compositions are treated by UV irradiation for a time sufficient to render the preceramic silazane polymer composition infusible. What is meant by "infusible" in this specification is that the UV treated preceramic silazane polymer composition, when heated rapidly up to the pyrolysis temperature, will not fuse together. A crude screen for infusibility is provided by the solubility of the preceramic silazane polymer composition in toluene. Prior to UV treatment, the preceramic silazane polymer compositions of this invention are almost completely soluble in toluene. The infusible preceramic silazane polymer compositions obtained by the method of this invention are either insoluble in toluene or have only limited solubility in toluene. The time required to render the preceramic silazane polymer composition infusible by the method of this invention will depend, in part, on the size of the preceramic silazane polymer composition article, the temperature of the UV treatment, the intensity and wavelength of the UV irradiation, the irradiation atmosphere, and the specific vinyl- or allyl-containing preceramic silazane polymer, mercapto compound, and photoinitiator employed. The time required to render the preceramic silazane polymer composition infusible can be as short as a few seconds. Longer UV irradiation times can be employed. The optimum treatment time can be determined by routine experimentation.

The amount of UV irradiation the preceramic silazane polymer composition should be exposed to is the amount sufficient to render the preceramic silazane polymer composition infusible. This required amount will vary from case to case depending, in part, upon the temperature, duration of exposure, intensity and wavelength of irradiation, the photoinitiator, the number of vinyl or allyl groups and mercapto groups in the preceramic silazane polymer and mercapto compound, respectively, and the actual preceramic silazane polymer used as well as other variables. The duration and intensity of the UV irradiation are obviously closely related variables.

The wavelength of the UV irradiation must, naturally, be in the range adsorbed by the preceramic silazane polymer compositions. Generally, UV light sources emitting at about 2537 Angstroms are satisfactory. Such UV light sources are readily available.

When the preceramic silazane polymer composition is in the form of a shaped object such as a fiber, it is not necessary to render the entire shaped article infusible. Rather only the outer surfaces, and sufficient interior portions directly adjacent to the outer surfaces, need be rendered infusible. The interior portion of the shaped article can cure during the pyrolysis of the shaped article to elevated temperature. Simply rendering the exterior infusible will prevent the shaped articles from fusing together or melting during the pyrolysis unless a break in the exterior surface occurs which allows the uncured interior to leak out.

The preceramic silazane polymer composition may be irradiated in a vacuum or under an inert or non-inert atmosphere. In order to minimize the incorporation of oxygen, it is preferred that the irradiation take place under a vacuum or an inert atmosphere such as argon or nitrogen. In the case of preceramic silazane polymer composition fibers, the UV irradiation may be carried out using a continuous, "on-line" method as the fibers are formed. Other methods of irradiation may be employed.

The preceramic silazane polymer compositions of this invention contain (1) a vinyl- or allyl-containing preceramic silazane polymer with an average of at least 0.7 vinyl or allyl groups per molecule, (2) a mercapto compound with at least two SH groups per molecule, and (3) a photoinitiator. The three components should be compatible with one another. Organic solvents may be used to enhance compatibility if needed. In some methods of preparing preceramic silazane fibers it may be necessary to employ an organic solvent to lower the viscosity of the preceramic silazane polymer composition. In such cases the solvent should be selected to serve both compatibility and viscosity requirements. The relative amounts of the three components should be selected such that the preceramic silazane polymer composition can be rendered infusible by UV exposure of a reasonable time duration. Because of the many variables involved, only general guidelines for the relative amounts of the three components can be offered. Generally, the molar ratio of SH groups to vinyl or allyl groups should be above one half. A molar SH/vinyl or SH/allyl ratio in the range of 0.6 to 1.0 is generally preferred. With mercapto groups containing large numbers of SH groups, this ratio may be reduced. Within these general restraints, preceramic silazane polymer compositions containing 5 to 15 weight percent of mercapto compound and 0.1 to 10 weight percent of photoinitiator, where the weight percentages are based on the preceramic silazane polymer weight, are usually satisfactory although lower or higher amounts can often be employed. Generally, it is preferred that the photoinitiator be present in the range of 2 to 5 weight percent based on the weight of the preceramic silazane polymer. For a particular application, the relative amounts of the three components required for a reasonable cure time with a particular light source can be determined by routine experimentation.

The vinyl- or allyl-containing preceramic silazane polymers suitable for use in this invention must contain an average of at least 0.7 vinyl or allyl groups per molecule. The preceramic silazane polymers may contain both vinyl and allyl groups such that the total average number of vinyl and allyl groups is at least 0.7 per molecule. Generally, however, the vinyl-containing preceramic silazane polymers are preferred. The vinyl- or allyl-containing preceramic silazane polymers suitable for this invention must be capable, when combined with the required mercapto compound and photoinitiator and cured by UV irradiation, of being converted to a ceramic material by pyrolysis at elevated temperatures. It is generally preferred that the preceramic silazane polymer compositions used in this invention be capable of being converted to ceramic materials in at least 40 weight percent yield. Mixtures of preceramic silazane polymers may also be used in this invention.

Examples of preceramic silazane polymers or polysilazanes suitable for use in this invention include vinyl- or allyl-containing polysilazanes as prepared by the method of Gaul in U.S. Pat. Nos. 4,312,970 (issued Jan. 26, 1982), 4,340,619 (issued July 20, 1982), 4,395,460 (issued July 26, 1983), and 4,404,153 (issued Sept. 13, 1983), all of which are hereby incorporated by reference. Suitable vinyl- or allyl-containing polysilazanes also include those prepared by the method of Haluska in U.S. Pat. No. 4,482,689 (issued Nov. 13, 1984) and Seyferth et al. in U.S. Pat. No. 4,397,828 (issued Aug. 9, 1983), both of which are hereby incorporated by reference. Other vinyl- or allyl-containing polysilazanes suitable for use in this invention can be prepared by the method of Cannady in U.S. Pat. No. 4,540,803 (issue Sept. 10, 1985) and U.S. Pat. No. 4,543,344 (issued Sept. 24, 1985) which are hereby incorporated by reference. Still other vinyl- or allyl-containing polysilazanes may be suitable for use in this invention.

Vinyl-containing or allyl-containing preceramic silazane polymers especially useful in this invention can be prepared by the methods described in U.S. Pat. Nos. 4,312,970, 4,340,619, and 4,540,803.

The vinyl- or allyl-containing preceramic silazane polymers prepared by the method of U.S. Pat. No. 4,312,970 are obtained by contacting and reacting in an inert, essentially anhydrous, atmosphere, an organochlorosilane or a mixture of organochlorosilanes of the general formula $$R'_c SiCl_{(4-c)}$$

with a disilazane having the general formula $$(R_3Si)_2NH$$

at a temperature in the range of 25° C. to 300° C. while distilling by-produced volatile products, wherein R' is selected from the group consisting of vinyl, allyl, phenyl, and alkyl radicals containing 1 to 4 carbon atoms; R is selected from the group consisting of vinyl, allyl, hydrogen, phenyl, and alkyl radicals containing 1 to 4 carbon atoms; and c has a value of 1 or 2. The R and R' groups must be selected such that the resulting preceramic silazane polymer has the required average number of vinyl and/or allyl groups.

The organochloromonosilanes of U.S. Pat. No. 4,312,970 are those having the general formula $$R'_c SiCl_{(4-c)}$$

where R' is vinyl, allyl, alkyl radical containing 1 to 4 carbon atoms or the phenyl group. Thus, those groups which are contemplated as being useful in this invention are methyl, ethyl, propyl, butyl, vinyl, allyl, and phenyl. The R' groups can all be the same or they can be different. The organochloromonosilanes are common commodity chemicals and are commercially available and, therefore, an explanation as to their preparation does not appear to be necessary. The value of c is 1 or 2. Thus, single organic group substituted silanes such as $CH_3SiCl_3$, $C_6H_5SiCl_3$, $(CH_2=CH)SiCl_3$, $(CH_2=CHCH_2)SiCl_3$ or $CH_3(CH_2)_2SiCl_3$, double organic substitute silanes such as $(CH_3)_2SiCl_2$, $(C_2H_5)_2SiCl_2$, $(CH_2=CH)(CH_3)SiCl_2$, and $(CH_2=CHCH_2)(CH_3)SiCl_2$, and mixtures of such silanes, for example $CH_3SiCl_3$ and $(CH_3)_2SiCl_2$, can be used. It is preferred that when organochlorosilane mixtures are used, the number of units of diorganosubstituted silicon atoms should not exceed the number of units of monoorgano-substituted silicon atoms.

The vinyl- or allyl-containing preceramic silazane polymers prepared by the method of U.S. Pat. No. 4,340,619 are obtained by contacting and reacting in an inert, essentially anhydrous, atmosphere, a chlorine-containing disilane or mixture of chlorine-containing disilanes, of the general formula $$(Cl_d R'_e Si)_2$$

with a disilazane having the general formula $$(R_3Si)_{NH}$$

at a temperature in the range of 25° C. to 300° C. while distilling by-produced volatile products, wherein R' is selected from the group consisting of vinyl, allyl, phenyl, and alkyl radicals containing 1 to 4 carbon atoms; R is selected from the group consisting of vinyl, allyl, hydrogen, phenyl, and alkyl radicals containing 1 to 4 carbon atoms; d has a value of 0.5-3; e has a value of 0-2.5 and the sum of (d+e) is equal to three. The R and R' groups must be selected such that the resulting preceramic silazane polymer has the required average number of vinyl and/or allyl groups.

The chlorine-containing disilanes of U.S. Pat. No. 4,340,619 are those disilanes having the general formula $$(Cl_d R'_e Si)_2$$

where R' is vinyl, allyl, an alkyl radical containing 1 to 4 carbon atoms or the phenyl groups. Thus, the R' groups are methyl, ethyl, propyl, butyl, vinyl, allyl, and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes. For the chlorine-containing disilanes described above, the values of d and e are 0.5-3 and 0-2.5, respectively, and the sum of (d+e) is equal to three. Examples of chlorine-containing disilanes are $(Cl_2(CH_3)Si)_2$, $(Cl(CH_3)_2Si)_2$, $(Cl_2(C_2H_5)Si)_2$, $(Cl(C_6H_5)_2Si)_2$ and $(Cl_2(CH_2=CH)Si)_2$. Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)(CH_3)_2SiCl$, $(CH_2=CH)(C_6H_5)_2SiCl$, $(CH_2=CHCH_2)(CH_3)SiCl_2$, $(C_2H_5)_2SiCl_2$, $C_6H_5SiCl_3$, and $(CH_2=CH)SiCl_3$ as well as $(C_6H_5)_2SiCl_2$, and $(C_6H_5)_3SiCl$. Incorporation of an appropriate vinyl- or allyl-containing monosilane may be used to obtain the required vinyl or allyl groups in the preceramic silazane polymer. When polysilazane polymers are prepared by the method of U.S. Pat. No. 4,340,619 for use in this invention it is preferred that mixtures of chlorine-containing disilanes be employed where the number of units of diorgano-substituted silicon atoms does not exceed the number of units on monoorgano-substituted silicon atoms.

The vinyl- or allyl-containing preceramic silazane polymers prepare by the method of U.S. Pat. No. 4,540,803 are obtained by contacting and reacting in an inert, essentially anhydrous atmosphere, trichlorosilane with a disilazane at a temperature in the range of 25° to 300° C. while removing by-produced volatile products, wherein said disilazane has the general formula $$(R_3Si)_2NH$$

where R is selected from the group consisting of vinyl, allyl, hydrogen, phenyl, and alkyl radicals containing 1 to 4 carbon atoms. The R groups must be selected such that the resulting preceramic silazane polymer has the required average number of vinyl and/or allyl groups. It appears that some component, possibly a hydrolysis product, in aged trichlorosilane is detrimental in the preparation of this preceramic silazane polymer. Such contaminated trichlorosilanes can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970, 4,340,619, and 4,540,803 is a disilazane of the general formula $(R_3Si)_2NH$. R in this formula is vinyl, allyl, hydrogen, an alkyl radical of 1 to 4 carbon atoms or the phenyl group. Therefore, R, for purposes of this formula, is represented by hydrogen, methyl, ethyl, propyl, butyl, vinyl, allyl, and phenyl. Each R group in this formula can be the same or they can be different. Examples of the disilazanes include

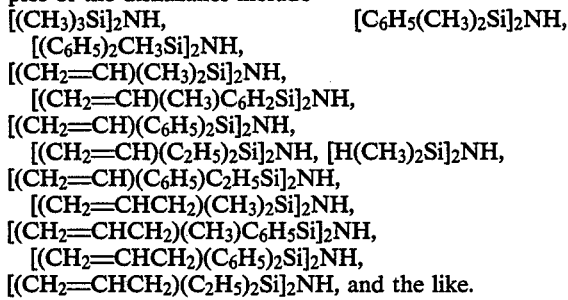

and the like.

The reactants in U.S. Pat. Nos. 4,312,970, 4,340,619, and 4,540,803 are brought together in an inert, essentially anyhdrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970, 4,340,619, and 4,540,803, the reaction begins which forms an intermediate amino compound. Upon heating, additional amino compound is formed and upon continued heating, $R_3SiCl$ is distilled from the reaction mixture and a silazane polymer is formed. The order of addition of the reactants does not appear to be critical. As the temperature is raised higher, more condensation takes place and crosslinking occurs with residual $R_3Si$— that is not distilled from the mixture acting as a chain stopper. This control allows one to stop the reaction at any point to obtain almost any desired viscosity. The desirable temperature range for this reaction is 25° to 300° C. A preferred temperature range for this reaction is 125° to 300° C. The length of time that the reaction requires depends on the temperature employed and the viscosity one wishes to achieve. What is meant by "volatile products" are the distillable by-produced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, the process requires the use of a vacuum along with the heat in order to remove these materials from the reaction mixture.

One especially preferred preceramic silazane polymer may be prepared by the general method described in U.S. Pat. No. 4,340,619 by reacting chlorine-containing disilanes from a Direct Process residue and an vinyl- or allyl-containing, chlorine-containing monosilane with hexamethyldisilazane. Preferred chlorine-containing monosilanes are phenylvinyldichlorosilane and vinyltrichlorosilane with phenylvinyldichlorosilane being especially preferred. The monosilane may be used to introduce unsaturation into the preceramic silazane polymer. Other vinyl- or allyl-containing monosilanes may be used.

The mercapto compounds useful in this invention must contain at least two SH groups per molecule. Mercapto compounds containing at least three SH groups are preferred. Both organo mercapto compounds and siloxy mercapto compounds may be used. Organic mercapto compounds containing at least three SH groups per molecule are most preferred. Mixtures of the mercapto compounds can also be used. Examples of suitable mercapto compounds include dipentaerythritol hexa(3-mercaptopropionate), pentaerythritol tetra(3-mercaptopropionate), pentaerythritol tetrathioglycolate, polyethylene glycol di(3-mercaptopropionate) of the formula

trimethylolethane tri(3-mercaptopropionate), trimethylolethane trithioglycolate, trimethylolpropane trithioglycolate, trimethylolpropane tri(3-mercaptopropionate),

and the like. Other mercapto compounds containing at least two SH groups, and preferably at least three SH groups, may be used.

The photoinitiators or photosensitizers useful in this invention are well known in the art. They include, for example, acetophenone, propiophenone, benzophenone, xanthone, fluorenone, benzaldehyde, fluorene, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 2,2-dimethoxy-2-phenylacetophenone, 2-hydroxy-2-methyl-1-(p-isopropylphenyl)propan-1-one, 2-hydroxy-2-methyl-1-phenylpropan-1-one, 2,2-diethoxyacetophenone, polysilanes, and like materials. The polysilane photoinitiators can be either vinyl- or allyl-containing polysilanes or non-vinyl- or non-allyl-containing polysilanes. Examples of polysilane photoinitiators include $[(CH_3)_2Si]_6$, $[(CH_3)Si]_a[(CH_3)_2Si]_b$ as described in U.S. Pat. No. 4,298,559, $[(CH_3)_2Si]_x$, $[(C_6H_5)_2Si]_x$, and the like. Preferred photoinitiators include benzophenone, 2-hydroxy-2-methyl-1-(p-isopropylphenyl)propan-1-one, 2-hydroxy-2-methyl-1-phenylpropan-1-one, and 2,2-diethoxyacetophenone. The amount of photoinitiator need only be sufficient to photoinitiate the system and will usually vary from 0.1 to 10 weight percent based on the weight of the preceramic silazane polymer. Generally, it is preferred that the amount of the photoinitiator be in the range of 2.0 to 5 weight percent based on the weight of the preceramic silazane polymer.

After the preceramic silazane polymer composition has been rendered infusible by treatment with UV irradiation, the infusible preceramic silazane polymer composition may be fired to an elevated temperature of at least 750° C. in an inert atmosphere, vacuum or ammonia-containing atmosphere until the mixture is converted to a ceramic material. Preferably the pyrolysis temperature is from about 1000° C. to about 1600° C. Since the preceramic silazane polymer compositions of this invention have been rendered infusible prior to pyrolysis, the pyrolysis step may be carried out by quickly raising the temperature to the desired level. If the preceramic silazane polymer composition is of sufficient viscosity or if it possesses a sufficiently low melt temperature, it can be shaped first, then rendered infusible, and then finally pyrolyzed to give a ceramic shaped article such as a fiber. Preferably the preceramic silazane polymer compositions used in the practice of this invention have a softening temperature of about 50° to 300° C. and most preferably in the range of 70° to 200° C. Such a softening temperature allows for the formation of preceramic fibers of known spinning techniques.

So that those skilled in the art can better appreciate and understand the invention, the following examples are given. Unless otherwise indicated, all percentages are by weight.

EXAMPLE 1

A vinyl-containing preceramic silazane polymer was prepared using the procedure of U.S. Pat. No. 4,340,619 by reacting chlorine-containing disilanes (obtained from a Direct Process residue) and phenylvinyldichlorosilane with hexamethyldisilazane. The resulting polymer had the following average formula:

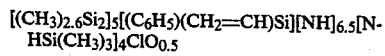
$[(CH_3)_{2.6}Si_2]_5[(C_6H_5)(CH_2=CH)Si][NH]_{6.5}[N-HSi(CH_3)_3]_4ClO_{0.5}$ This preceramic silazane polymer had an average molecular weight of about 2000 g/mole. A preceramic polymer composition in toluene was prepared by mixing 23.1 g (0.0116 moles) of the above silazane polymer, 7.0 g (0.0079 moles) of the mercapto compound $(CH_3)_3SiO\{CH_3[HSCH_2CH(CH_3)CH_2]SiO\}_5Si(CH_3)_3$, and 0.6 g (0.0036 moles) of the photoinitiator Darocur 1173. The $SH/(CH_2=CH)$ molar ratio was about 3.4. Darocur 1173 is 2-hydroxy-2-methyl-1-phenylpropan-1-one obtained from EM Chemicals, Hawthorne, N.Y. The toluene level was adjusted to achieve an appropriate solution viscosity (about 100 to 200 poises) for dry spinning. The solution was then dry spun in ambient air from a melt rheometer. Spinning was carried out at 25° C. under an argon pressure of about 15–20 psi. The fibers (estimated average diameter of about 50 to 100 microns) were collected and stored under argon.

The fibers were exposed to UV irradiation using an Ashde Model UV-12H2 conveyor curing oven equipped with two Hanovia 20 inch, 200 watt/inch medium pressure mercury vapor lamps obtained from Koch-Technical Products Division, George Koch Sons, Inc. of Evansville, Ind. The uncured fibers were completely soluble in toluene. After exposure to UV irradiation (a dosage of about 40 mJ/cm²), the fibers were insoluble in toluene. The toluene insolubility indicates that the fibers had been rendered infusible.

EXAMPLE 2

A vinyl-containing preceramic silazane polymer similar to that of Example 1 was employed. The molecular weight was about 1100 g/mole. The photoinitiator was Darocur 1173 which was added at a level of 4 weight percent based on the preceramic polymer weight. The mercapto compound $(CH_3)_3SiO\{CH_3[HSCH_2CH(CH_3)CH_2]Si(CH_3)_3$ was added at various levels to give different $SH/(CH_2=CH)$ molar ratios. The preceramic polymer compositions were made up in a 50 weight percent solution in toluene. The resulting solution has an initial viscosity of about 8 centistokes at 25° C. The preceramic polymer composition solutions were exposed to UV irradiation in a photochemical turntable reactor (Ace Glass Inc., Vineland, N.J.) equipped with a Conrad-Hanovia medium pressure mercury-vapor lamp. The preceramic polymer composition solutions were placed in quartz test tubes, capped, and then individually exposed to UV light at a dosage of about 200 mJ/cm² over a 4 minute period. Curing was estimated by the final viscosity of the solution. A significant increase in viscosity indicates partial curing whereas gel formation suggests complete curing. The following results were obtained.

| $SH/(CH_2=CH)$ molar ratio | Final Viscosity | Result |
| --- | --- | --- |
| 0.4 | some gels | partial cure |
| 0.8 | gel | complete cure |

EXAMPLE 3

The same materials and procedure as in Example 2 were used except that the mercapto compound employed was dipentaerythritol hexa(3-mercaptopropionate) which has six SH groups per molecule and the samples were exposed to UV irradiation at a dosage of about 800 mJ/cm² over a five minute period. The following results were obtained.

| $SH/(CH_2=CH)$ molar ratio | Final Viscosity (centistokes) | Result |
| --- | --- | --- |
| 0.4 | >1000 | partial cure |
| 0.6 | gel | complete cure |
| 0.8 | gel | complete cure |

EXAMPLE 4

The same materials and procedure as in Example 2 were used except that the mercapto compound employed was pentaerythritol tetra(3-mercaptopropionate) with four SH groups per molecule and the samples were exposed to UV irradiation at a dosage of about 800 mJ/cm² over a five minute period. The following results were obtained.

| $SH/(CH_2=CH)$ molar ratio | Final Viscosity (centistokes) | Result |
| --- | --- | --- |
| 0.2 | <10 | no cure |
| 0.4 | 100 | no cure |
| 0.6 | gel | complete cure |
| 0.8 | gel | complete cure |

EXAMPLE 5

The same materials and procedure as in Example 2 were used except that the mercapto compound employed was trimethylolpropane tri(3-mercaptopropionate) with three SH groups per molecule and the samples were exposed to UV irradiation at a dosage of about 800 mJ/cm$^2$ over a five minute period. The following results were obtained.

| SH/(CH$_2$=CH) molar ratio | Final Viscosity | Result |
| --- | --- | --- |
| 0.6 | gel | complete cure |
| 0.8 | gel | complete cure |

EXAMPLE 6

The same materials and procedure as in Example 2 were used except that the mercapto compound employed was HSCH$_2$CH$_2$COOCH$_2$(CH$_2$OCH$_2$)$_{11}$CH$_2$OOCCH$_2$CH$_2$SH which has two SH groups per molecule. The following result was obtained.

| SH/(CH$_2$=CH) molar ratio | Final Viscosity | Result |
| --- | --- | --- |
| 0.8 | some gel | partial cure |

EXAMPLE 7

This example is included for comparison purposes only. The same materials and procedure as in Example 2 were used except that various mercapto compounds containing two SH groups were employed. The following mercapto compounds were used: (1) [HSCH$_2$COOCH$_2$]$_2$ at SH/(CH$_2$=CH) molar ratios of 0.4, 0.8, and 1.5; (2) HSCH$_2$CH$_2$COOCH$_2$(CH$_2$OCH$_2$)$_{11}$CH$_2$OOCCH$_2$CH$_2$SH at SH/(CH$_2$=CH) molar ratios of 0.4 and 0.8; and (3) [HSCH$_2$CH$_2$CH$_2$Si(CH$_3$)$_2$]$_2$O at a SH/(CH$_2$=CH) molar ratio of 0.8. All compositions in this example failed to cure. It is possible that such compositions might be curable by UV irradiation at higher SH/(CH$_2$=CH) molar ratios.

EXAMPLE 8

Fibers (average diameters of about 50 to 60 microns) were obtained by a dry spinning technique using compositions prepared by adding 10.0 percent pentaerythriol tetra(3-mercaptopropionate) and 4.0 percent Darocur 1173 (2-hydroxy-2-methyl-1-phenylpropan-1-one), based on the weight of the polymer, to a 75 percent vinyl-containing preceramic silazane polymer solution in toluene. The preceramic silazane polymer was similar to the preceramic silazane polymer used in Example 2. The resulting toluene solution had a viscosity of about 200 poises at 24° C. Fiber samples were cured with UV irradiation at various dosages in an off-line UV Rayonet Photo-Reactor Model 100 equipped with sixteen 75 W/250 V low pressure mercury vapor lamps from Southern New England Co., Hamden, Conn. The cure temperature was about 40° C. Cured fibers were pyrolyzed to 1200° C. in a nitrogen atmosphere. Tensile strengths were determined using Instron Tensile Tester Model TM from Instron Engineering Corporation, Canton, Mass. The following results were obtained when the curing was carried out in the presence of oxygen.

| UV Exposure (seconds) | Tensile Strength (MPa) | |
| --- | --- | --- |
| | Cured Fiber | Cured, Pyrolyzed Fiber |
| 60 | 7.0 | 114 |
| 120 | 7.9 | 246 |
| 300 | 5.6 | 259 |
| 600 | 7.6 | 583 |

The following results were obtained when the curing was carried out in the absence of oxygen.

| UV Exposure (seconds) | Tensile Strength (MPa) | |
| --- | --- | --- |
| | Cured Fiber | Cured, Pyrolyzed Fiber |
| 5 | 5.9 | 99.6 |
| 30 | 4.9 | 156 |
| 60 | 5.4 | 145 |
| 300 | 5.7 | 218 |

All fiber samples survived the pyrolysis intact. These results indicate that UV curing can be effective for fibers under these conditions using exposure times of five seconds or less. Therefore, this example suggests that for fiber production, the UV irradiation may be carried out using a continuous, "on-line" method as the fibers are formed.

That which is claimed:

1. A method of rendering a preceramic silazane polymer material infusible prior to pyrolysis, which method comprises treating the preceramic silazane polymer material with UV irradiation for a time sufficient to render the preceramic silazane polymer material infusible wherein the preceramic silazane polymer material contains
   (1) a vinyl- or allyl-containing preceramic silazane polymer with an average of at least 0.7 vinyl or allyl groups per molecule,
   (2) a mercapto compound with at least two SH groups per molecule, and
   (3) a photoinitiator.

2. A method as defined in claim 1 wherein the preceramic silazane polymer material contains a vinyl-containing preceramic silazane polymer with an average of 0.7 vinyl groups per molecule and wherein the SH/(CH$_2$=CH) molar ratio is greater than one half.

3. A method as defined in claim 1 wherein the mercapto compound contains at least three SH groups per molecule.

4. A method as defined in claim 2 wherein the mercapto compound contains at least three SH groups per molecule.

5. A method as defined in claim 2 wherein the preceramic silazane polymer material is a fiber.

6. A method as defined in claim 3 wherein the preceramic silazane polymer material is a fiber.

7. A method as defined in claim 4 wherein the preceramic silazane polymer material is a fiber.

8. A method as defined in claim 4 wherein the SH/(CH$_2$=CH) molar ratio is in the 0.6 to 1.0 range.

9. A method as defined in claim 4 wherein the preceramic silazane polymer material contains 5 to 15 weight percent of the mercapto compound and 0.1 to 10 weight percent of the photoinitiator based on the weight of the preceramic silazane polymer.

10. A method as defined in claim 9 wherein the photoinitiator is present in the range of 2.0 to 5.0 weight percent based on the weight of the preceramic silazane polymer.

11. A method as defined in claim 7 wherein the photoinitiator is selected from the group consisting of benzophenone, 2-hydroxy-2-methyl-1-(p-isopropylphenyl)-propan-1-one, 2-hydroxy-2-methyl-1-phenylpropan-1-one, and 2,2-diethoxyacetophenone.

12. A method as defined in claim 8 wherein the photoinitiator is selected from the group consisting of benzophenone, 2-hydroxy-2-methyl-1-(p-isopropylphenyl)-propan-1-one, 2-hydroxy-2-methyl-1-phenylpropan-1-one, and 2,2-diethoxyacetophenone.

13. A method as defined in claim 9 wherein the photoinitiator is selected from the group consisting of benzophenone, 2-hydroxy-2-methyl-1-(p-isopropylphenyl)-propan-1-one, 2-hydroxy-2-methyl-1-phenylpropan-1-one, and 2,2-diethoxyacetophenone.

14. A preceramic silazane polymer composition comprising
   (1) a vinyl- or allyl-containing preceramic silazane polymer with an average of at least 0.7 vinyl or allyl groups per molecule,
   (2) a mercapto compound with at least two SH groups per molecule, and
   (3) a photoinitiator.

15. A composition as defined in claim 14 wherein the mercapto compound contains at least three SH groups.

16. A composition as defined in claim 15 wherein the mercapto compound is present in the range of 5 to 15 weight percent and wherein the photoinitiator is present in the range of 0.1 to 10 weight percent where the percentages are based on the weight of the preceramic silazane polymer.

17. A composition as defined in claim 16 wherein the preceramic silazane polymer is a vinyl-containing preceramic silazane polymer with an average of 0.7 vinyl groups per molecule and wherein the $SH/(CH_2=CH)$ molar ratio is greater than one half.

18. A composition as defined in claim 16 wherein the $SH/(CH_2=CH)$ molar ratio is in the 0.6 to 1.0 range.

19. A composition as defined in claim 14 wherein the photoinitiator is selected from the group consisting of benzophenone, 2-hydroxy-2-methyl-1-(p-isopropylphenyl)propan-1-one, 2-hydroxy-2-methyl-1-phenylpropan-1-one, and 2,2-diethoxyacetophenone.

20. A composition as defined in claim 17 wherein the photoinitiator is selected from the group consisting of benzophenone, 2-hydroxy-2-methyl-1-(p-isopropylphenyl)propan-1-one, 2-hydroxy-2-methyl-1-phenylpropan-1-one, and 2,2-diethoxyacetophenone.

* * * * *